G. E. JOHNSON.
CATCHER FOR TRAIN ORDER HOOPS.
APPLICATION FILED JULY 30, 1909.
954,300.
Patented Apr. 5, 1910.
2 SHEETS—SHEET 1.
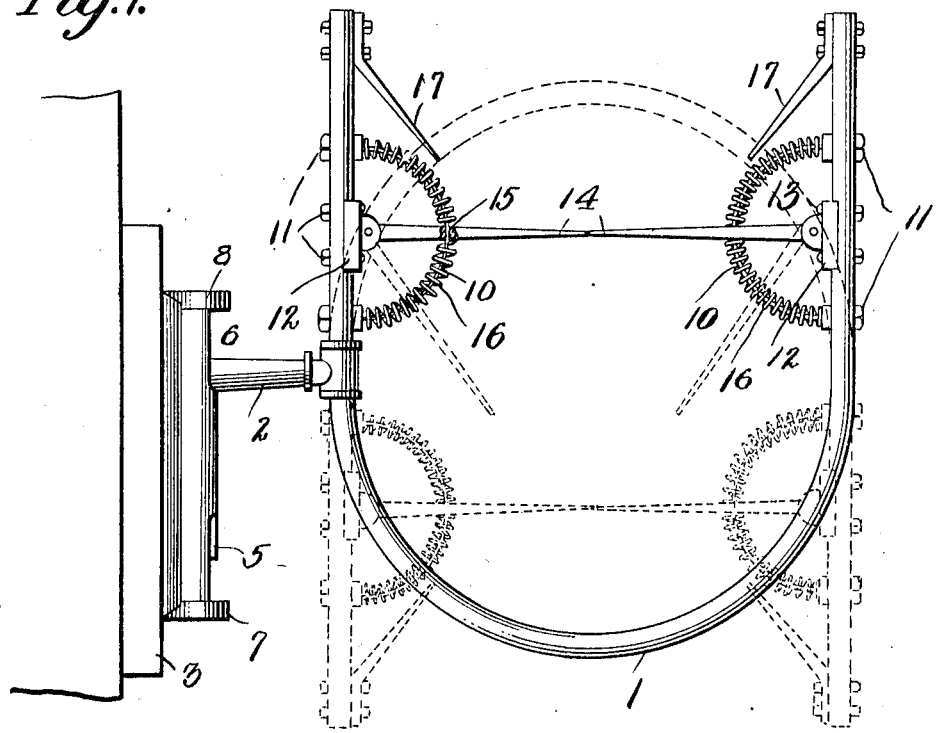
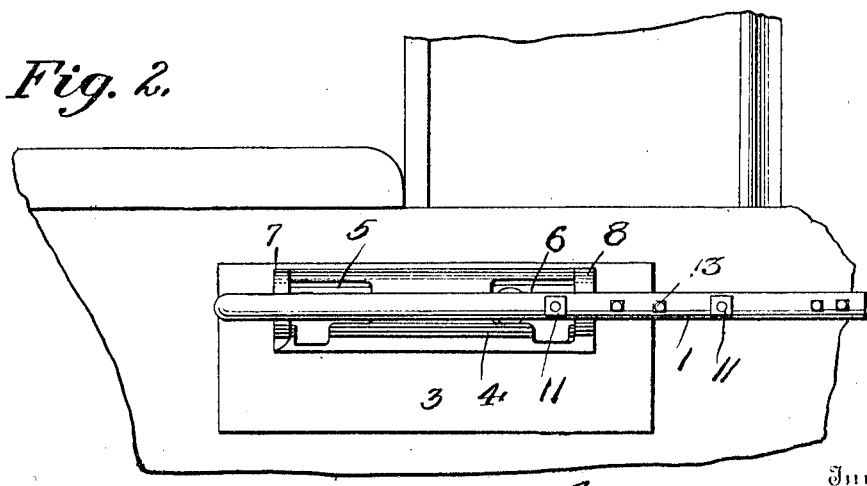

G. E. JOHNSON.
CATCHER FOR TRAIN ORDER HOOPS.
APPLICATION FILED JULY 30, 1909.
954,300.
Patented Apr. 5, 1910.
2 SHEETS—SHEET 2.
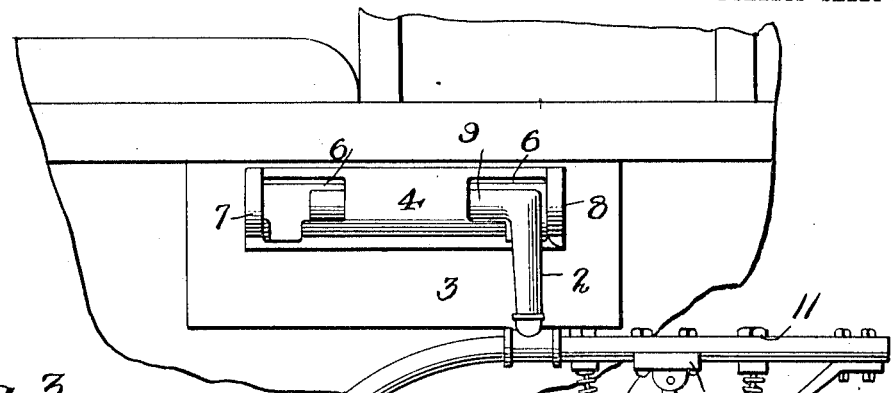
Fig. 3.
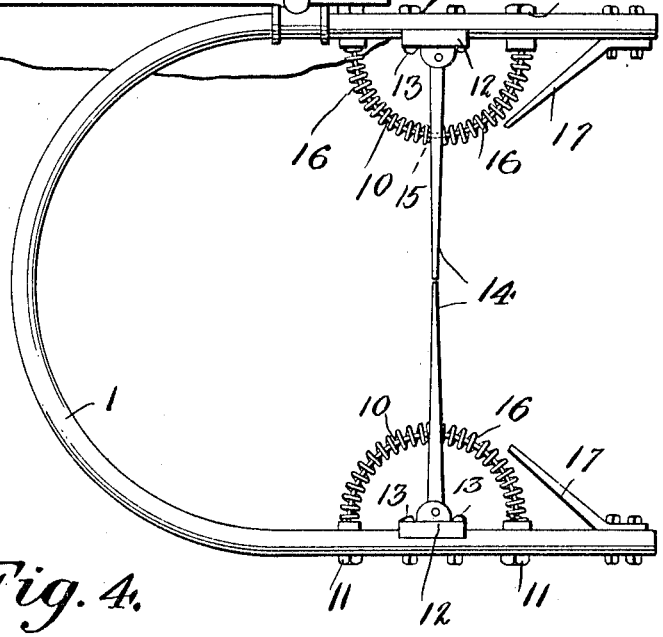
Fig. 5.
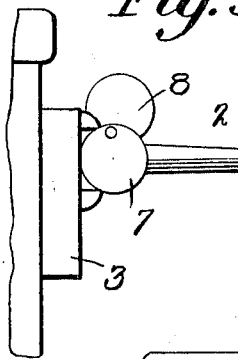
Fig. 4.
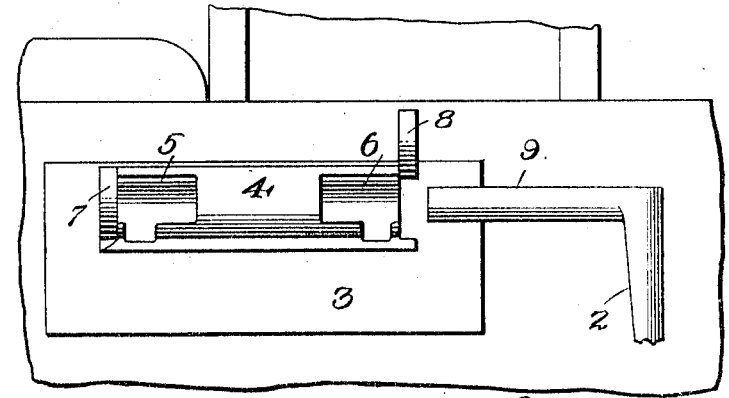
Witnesses
Jo. F. Collins
M. L. Newcomb
Inventor
George E. Johnson
By
His Attorney

UNITED STATES PATENT OFFICE.

GEORGE EPPA JOHNSON, OF ELLENSBURG, WASHINGTON.

CATCHER FOR TRAIN-ORDER HOOPS.

954,300.     Specification of Letters Patent.    Patented Apr. 5, 1910.

Application filed July 30, 1909. Serial No. 510,432.

*To all whom it may concern:*

Be it known that I, GEORGE E. JOHNSON, a citizen of the United States, residing at Ellensburg, county of Kittitas, and State of Washington, have invented certain new and useful Improvements in Catchers for Train-Order Hoops, of which the following is a specification.

This invention relates to catchers for train order hoops.

The present invention has for its object the provision of a catcher of simple, strong, durable, and inexpensive construction possessing novel features, which is adapted to be applied to either side of the cab of a locomotive or a caboose and positioned to face either way, which will be adapted to automatically catch and retain train order hoops, without requiring attention on the part of the engineer, fireman, or member of the train crew, thereby obviating inaccuracy and danger incident to catching train order hoops by hand, a practice which commonly prevails.

The invention is carried out by the provision of a catcher of novel construction as will appear more fully hereinafter.

In the accompanying drawings:—Figure 1 is a plan view, dotted lines showing the reversed position of the catcher; Fig. 2, a side elevation when the catcher is in horizontal position; Fig. 3, a side elevation when the catcher is in lowered or vertical position; Fig. 4, a detail view showing how the handle or stem can be removed for reversal; and Fig. 5, a detail end view illustrating the operation of the retainers.

The catcher is preferably composed of a U-shaped frame, of piping, for instance, 1 to which is secured a shank or handle 2. The shank or handle 2 may be secured to the side of the locomotive cab or caboose in different ways but I prefer the securing and reversing device which is shown, consisting of a plate 3, a tubular holder 4 secured thereto in horizontal arrangement which has notches 5 and 6 at its respective ends and whose ends are open but are provided with pivoted disk-like retainers 7 and 8. The handle or stem 2 has a part 9 disposed angularly thereto which is adapted to be slid into the holder from the end thereof and by the engagement of the stem 2 with either of the notches 5 or 6, the entire catcher may be held in extended position or dropped down along side the locomotive cab. By removing the part 9 from the holder and reversing the same and entering it into the opposite end of the holder, the catcher may be reversed to be used when the train is backed. The hinged disk-like retainers 7 and 8 prevent detachment of the stem 2 from the holder and afford means whereby it may be quickly released from the holder.

The catcher is provided with substantially semi-circular guides 10 on both of its arms, said guides being suitably secured by nuts 11 and being disposed opposite each other. Pivoted to brackets 12 which are suitably secured to the frame 1 by fastenings 13 are levers 14 which have an opening 15 through which the guide 10 passes. Surrounding the guides 10 and disposed on opposite sides of the levers 14 are coil springs 16 which respectively balance each other in regard to their action on the levers 14 so that the latter are normally retained in the intermediate position and in line with each other. Secured in advance of the levers 14 on the frame 1 are guards 17 which prevent injury to the springs 16.

Assuming that the open part of the frame 1 points toward the direction in which the train is traveling and that the catcher is in horizontal position by virtue of the reception of the stem 2 in the notch 5, when a train order hoop is encountered, it strikes against the levers 14 and causes them to swing inwardly as shown by dotted lines, the hoop passing over one of the arms of the frame 1 and finally resting in the yoke thereof from which it can be readily detached by a member of the crew. The springs 16 at once return the levers 14 to normal position after a hoop has been caught.

I am aware that various changes of construction could be resorted to in carrying out my invention and I do not limit it to the specific construction set forth.

Having thus described my invention, what I claim as new and desire to secure by Letters Patent, is:

1. A catcher for train order hoops consisting of a catcher frame having an arm over which the hoop is adapted to pass, a catcher lever carried by said arm, and opposed springs acting upon said lever.

2. A catcher for train order hoops consisting of a catcher frame having an arm over which the hoop is adapted to pass, movable levers disposed opposite each other with their free ends located adjacent each other, and spring means adapted to retain the levers in normal position.

3. A catcher for train order hoops consisting of a catcher frame having an arm over which the hoop is adapted to pass, movable levers disposed opposite each other with their free ends located adjacent each other, and opposed springs respectively coöperating with the levers whereby said levers are independently yieldingly held in normal position.

4. A catcher for train order hoops consisting of an open frame having arms, and opposed spring actuated levers disposed on the respective arms and pointing in opposite directions.

5. In a catcher for train order hoops, the combination with a frame having an arm over which the hoop is adapted to pass, of a lever pivoted thereto, an arc-shaped guide for the lever and opposing coil springs surrounding the guide on opposite sides of the lever.

6. In a catcher for train order hoops, the combination with a catcher frame having an arm, of a spring actuated lever carried thereby, and a guard carried by the arm in advance of the lever.

7. In a catcher for train order hoops, the combination with a catcher frame having means for catching and holding the hoop, of a holder on the car consisting of a tubular member open at both ends which is adapted to receive the shank of the frame and permit reversal thereof and having means to secure the frame in position.

8. In a catcher for train order hoops, the combination with a catcher frame having means for catching and holding the hoop, of a holder on the car consisting of a tubular member open at both ends which is adapted to receive the shank of the frame and permit reversal thereof and having means to secure the frame in position and closures for the opposite ends of said tubular holder.

In testimony whereof, I hereunto affix my signature in presence of two witnesses.

GEO. EPPA JOHNSON.

Witnesses:
A. J. BONNEY,
E. S. JONES.